US008908579B2

(12) United States Patent
Liu et al.

(10) Patent No.: US 8,908,579 B2
(45) Date of Patent: Dec. 9, 2014

(54) COMMUNICATION PROTOCOL TECHNIQUE FOR IMPROVING DATA THROUGHPUT

(75) Inventors: Yuan Liu, Holmdel, NJ (US); Sethuraman Gurumoorthy, Piscataway, NJ (US); Yaxin Cao, Laurance Harbor, NJ (US); Giridhar Pattaswamy, Bracknell (GB); Navin K. Karra, Bracknell (GB); Abhishek Pandit, Wokingham (GB); Stephen J. Richards, Maidenhead (GB)

(73) Assignee: Broadcom Corporation, Irvine, CA (US)

( * ) Notice: Subject to any disclaimer, the term of this patent is extended or adjusted under 35 U.S.C. 154(b) by 33 days.

(21) Appl. No.: 13/474,006

(22) Filed: May 17, 2012

(65) Prior Publication Data

US 2013/0148574 A1   Jun. 13, 2013

Related U.S. Application Data

(60) Provisional application No. 61/569,621, filed on Dec. 12, 2011, provisional application No. 61/587,521, filed on Jan. 17, 2012, provisional application No. 61/595,546, filed on Feb. 6, 2012.

(51) Int. Cl.
*H04J 11/00* (2006.01)
*H04W 4/00* (2009.01)
*H04W 36/00* (2009.01)
*G06F 15/177* (2006.01)
*H04W 36/08* (2009.01)

(52) U.S. Cl.
CPC .......... *H04W 36/005* (2013.01); *H04W 36/08* (2013.01)
USPC ........ 370/310; 455/422.1; 455/436; 455/437; 455/439; 709/220; 709/221

(58) Field of Classification Search
CPC ... H04W 48/18; H04W 88/06; H04W 36/005; H04W 36/00; H04W 36/08; H04W 36/14
USPC ............... 370/310, 329, 331; 455/422.1, 436, 455/437, 439, 442, 443, 444; 709/220, 221, 709/227, 228
See application file for complete search history.

(56) References Cited

U.S. PATENT DOCUMENTS

| 2004/0141479 | A1* | 7/2004 | Cha et al. ...................... 370/329 |
| 2008/0088408 | A1 | 4/2008 | Backman |
| 2009/0131054 | A1* | 5/2009 | Zhang .......................... 455/436 |

FOREIGN PATENT DOCUMENTS

| EP | 1278348 | 1/2003 |
| EP | 1 953 975 A1 | 8/2008 |
| WO | WO 2008/041111 A2 | 4/2008 |
| WO | WO 2011/059521 A1 | 5/2011 |
| WO | WO 2011/082552 A1 | 7/2011 |

OTHER PUBLICATIONS

Wei, "Experimental Study of Hierarchical Mobile IPv6 handover Performance", Oct. 8, 2008, IEEE, all pages.*

(Continued)

*Primary Examiner* — Kwang B Yao
*Assistant Examiner* — Adam Duda
(74) *Attorney, Agent, or Firm* — Brinks Gilson & Lione

(57) ABSTRACT

An acknowledgement technique reduces packet-switched communication delays. The technique may be implemented in a mobile communication device with multiple SIMs. The technique facilitates enhanced communication capability for the mobile communication device. In one implementation, the technique helps reduce delays caused by switching between packet-switched and circuit-switched communications. Specifically, in one aspect, the technique reduces delays caused by exponential backoff that may occur during suspension of a packet-switched communication.

20 Claims, 9 Drawing Sheets

(56) References Cited

OTHER PUBLICATIONS

Blough, "Lesson: TCP Congestion Control, Part 2; TCP Timeout and Retransmission", Oct. 9, 2008, ECE Dept of Georgia Tech., all pages.*

European Search Report from corresponding European patent application No. EP12 00 6268, Apr. 15, 2013, 10 pages.
Korean Office Action from corresponding Korean Patent Application No. 10-2012-0104368, 4 pgs., dated Nov. 21, 2013.
Yifei Wei et al., Experimental Study of Hierarchical Mobile IPv6 Handover Performance, 6pp., IEEE 2008.

* cited by examiner

US 8,908,579 B2

COMMUNICATION PROTOCOL TECHNIQUE FOR IMPROVING DATA THROUGHPUT

PRIORITY CLAIM

This application claims the benefit of priority to the following U.S. provisional patent applications: U.S. Patent Application No. 61/569,621, filed 12 Dec. 2011; U.S. Patent Application No. 61/587,521, filed 17 Jan. 2012; and U.S. Patent Application No. 61/595,546, filed 6 Feb. 2012.

TECHNICAL FIELD

This disclosure relates to communication devices with at least one Subscriber Identity Module (SIM). The disclosure also relates to a communication protocol (e.g., Transmission Control Protocol (TCP)/Internet Protocol (IP)) technique for improving data throughput, as well as a virtual modem resumption handler.

BACKGROUND

Rapid advances in electronics and communication technologies, driven by immense customer demand, have resulted in the widespread adoption of mobile communication devices. The extent of the proliferation of such devices is readily apparent in view of some estimates that put the number of wireless subscriber connections in use around the world at nearly 80% of the world's population. Furthermore, other estimates indicate that (as just three examples) the United States, Italy, and the UK have more mobile phones in use in each country than there are people living in those countries.

Relatively recently, cellular phone manufactures have introduced phone designs that include multiple SIM cards. Each SIM card facilitates a separate connection to the same network or different networks. As a result, the SIMs provide the owner of the phone with, for example, two different phone numbers handled by the same phone hardware. Accordingly, the multiple SIM approach alleviates to some degree the need to carry different physical phones, and improvements in multiple SIM communication devices will continue to make such devices attractive options for the consumer.

BRIEF DESCRIPTION OF THE DRAWINGS

The innovation may be better understood with reference to the following drawings and description. In the figures, like reference numerals designate corresponding parts throughout the different views.

DETAILED DESCRIPTION

The discussion below refers to user equipment. User equipment may take many different forms and have many different functions. As one example, user equipment may be a cellular phone capable of making and receiving wireless phone calls. The user equipment may also be a smartphone that, in addition to making and receiving phone calls, runs general purpose applications. User equipment may be virtually any device that wirelessly connects to a network, including as additional examples a driver assistance module in a vehicle, an emergency transponder, a pager, a satellite television receiver, a networked stereo receiver, a computer system, music player, or virtually any other device. The discussion below addresses how to manage PS call delay in user equipment that includes one or more Subscriber Identity Modules (SIM).

Figure 1:
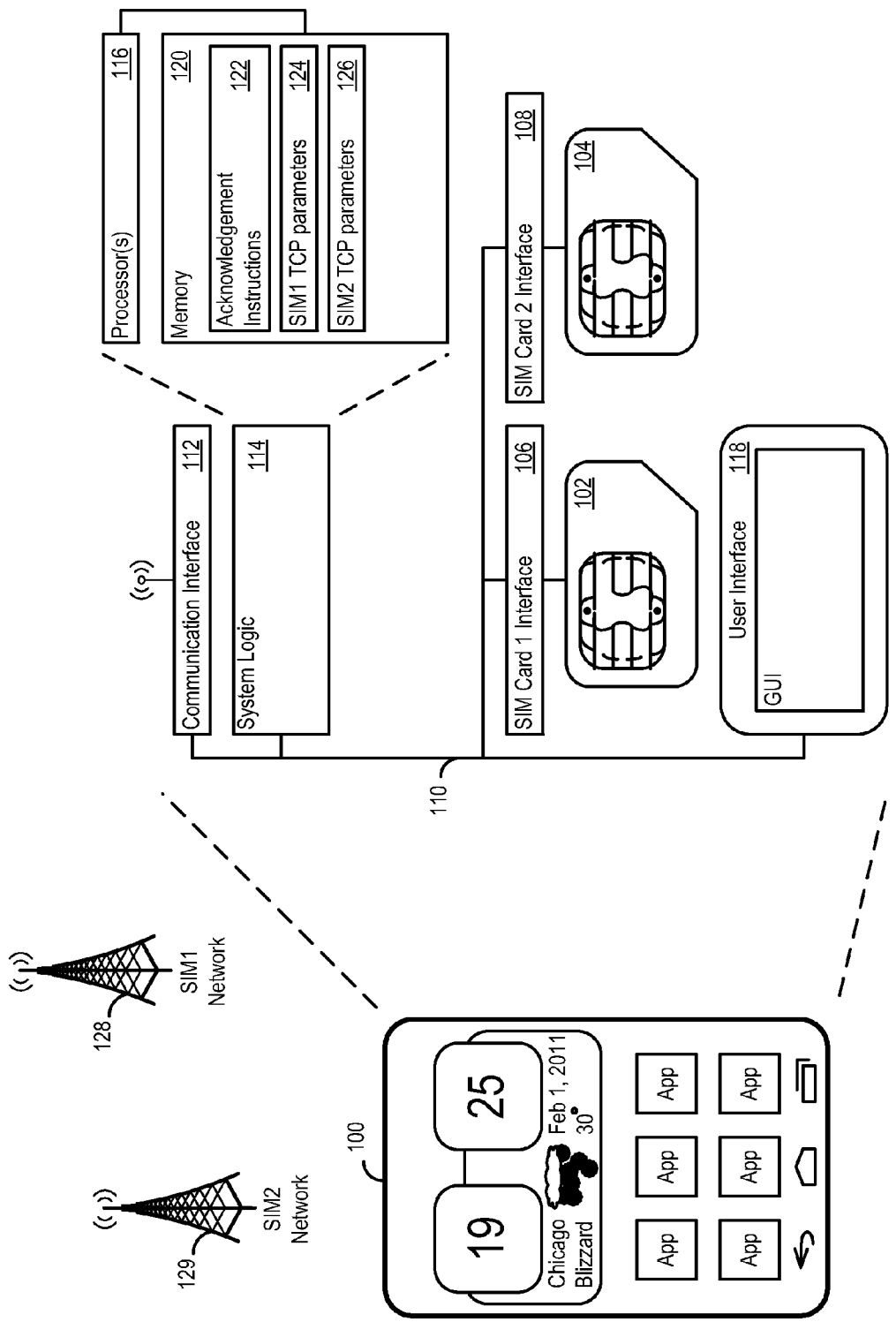
FIG. 1 shows an example of user equipment with multiple SIMs.

FIG. 1 shows an example of user equipment 100 with multiple SIMs, in this example the SIM1 102 and the SIM2 104. An electrical and physical interface 106 connects SIM1 102 to the rest of the user equipment hardware, for example, to the system bus 110. Similarly, an electrical and physical interface 108 connects the SIM2 to the system bus 110.

The user equipment 100 includes a communication interface 112, system logic 114, and a user interface 118. The system logic 114 may include any combination of hardware, software, firmware, or other logic. The system logic 114 may be implemented, for example, in a system on a chip (SoC), application specific integrated circuit (ASIC), or other circuitry. The system logic 114 is part of the implementation of any desired functionality in the user equipment 100. In that regard, the system logic 114 may include logic that facilitates, as examples, running applications, accepting user inputs, saving and retrieving application data, establishing, maintaining, and terminating cellular phone calls, wireless network connections, Bluetooth connections, or other connections, and displaying relevant information on the user interface 118. The user interface 118 may include a graphical user interface, touch sensitive display, voice or facial recognition inputs, buttons, switches, and other user interface elements.

The communication interface 112 may include one or more transceivers. The transceivers may be wireless transceivers that include modulation/demodulation circuitry, power amplifiers, low noise amplifiers, coders/decoders, waveform shaping circuitry, phase locked loops (PLLs), clock generators, analog to digital and digital to analog converters and/or other logic for transmitting and receiving through one or more antennas, or through a physical (e.g., wireline) medium. As one implementation example, the communication interface 112 and system logic 114 may include a BCM2091 EDGE/HSPA Multi-Mode, Multi-Band Cellular Transceiver and a BCM59056 advanced power management unit (PMU), controlled by a BCM28150 HSPA+ system-on-a-chip (SoC) baseband smartphone processor. These integrated circuits, as well as other hardware and software implementation options for the user equipment 100, are available from Broadcom Corporation of Irvine Calif. The transmitted and received signals may adhere to any of a diverse array of formats, protocols, modulations, frequency channels, bit rates, and encodings. As one specific example, the communication interface 112 may support transmission and reception under the Universal Mobile Telecommunications System (UMTS). The techniques described below, however, are applicable to other communications technologies regardless of whether they arise from the 3rd Generation Partnership Project (3GPP), GSM (R) Association, Long Term Evolution (LTE)™ efforts, or other partnerships or other standards bodies.

Existing communication standards include the Transport Control Protocol (TCP)/Internet Protocol (IP) standard. The user equipment 100 may implement any such standard as part of the logic that handles data connections, and more specifically to handle data packet communications between the user equipment 100 and the networks. While an example using TCP is given below, the techniques discussed in this detailed description are not limited to TCP. Some goals of TCP include providing reliability and systematic communication of packets from one user equipment to another. Because of these benefits, TCP is the protocol that the majority of Internet applications use, including World Wide Web browsers, email clients, remote administration and file transfer applications, and many others. Other applications, which require less reliable data or systematic communication, may use the User Datagram Protocol (UDP), which provides a datagram service that trades reduced latency for reliability.

In one implementation, the system logic 114 includes one or more processors 116 and a memory 120. The memory 120 stores, for example, acknowledgement instructions 122 that the processor 116 executes. SIM1 102 and SIM2 104 may be on the same or different networks, and may be served by the same or different cells. For example, the Node B 128 may manage a particular cell to which SIM1 102 is connected, while the Node B 129 may manage a different cell to which SIM2 104 is connected. Accordingly, SIM 1 102, SIM 2 104, or both, may independently establish connections with their networks, with the connections governed by TCP/IP (or another communication protocol). The user equipment 100 may store a set of TCP parameters for each of the SIMs in the memory 120 as the SIM1 TCP parameters 124 and the SIM2 TCP parameters 126. The memory 120 may store TCP headers, data sections, datagrams, or any other structure or data in support of the TCP (or other) communication protocol.

Examples of the TCP parameters include sequence number, acknowledgement numbers, IP addresses, and Ethernet addresses. Other examples include fields of the header and data section, and protocol operations, such as connection establishment, connection termination, resource usage, data transfer, reliable transmission, error detection, flow control, congestion control, maximum segment size, selective acknowledgements, window scaling, timestamps, out of band data, and forcing data delivery. A field of a TCP data section may include a payload, and fields of a header section may include source port, destination port, sequence number, acknowledgment number, data offset, flags, window size, checksum, urgent pointer, options, and padding, for example.

As mentioned above, the Node B 128 may be part of a network that supports SIM1 102, while the Node B 129 may be part of the same or different network that supports SIM2 104. As will be described in more detail below, the system logic 114 will try to reduce inefficient TCP communications over the network connections that SIM1 102 and SIM2 104 establish. Such inefficiencies sometimes result because of large retransmission timeout, and the system logic 114 may take steps to address lengthy retransmission timeouts.

Some of the following examples discuss dual SIM use cases. However, it is noted that the techniques described below may be implemented in user equipment with a single SIM or with more than two SIMs. For example, user equipment with a single SIM or with more than two SIMs may establish a data connection (e.g., for a web browsing session) with a peer, and may encounter environmental conditions in which TCP acknowledgements are lost or that would otherwise cause a backoff timer to begin its exponential increase before more data is sent to the user equipment. In such situations, the user equipment may recognize the delay in receiving data from the peer, and may repeat one or more times a prior TCP acknowledgement with TCP sequence number to the peer in an attempt to restart data transfer without waiting for the backoff timer to expire. Thus, the techniques described below are not limited to dual SIM use cases.

An example of a single SIM use case is the following. Assume that a data connection is established between the user equipment and the network. The user equipment may switch its connection to answer an incoming voice call, temporarily suspend the data connection to check for paging indicators, may place a voice call, or may otherwise interrupt the data connection at any time, without terminating the data connection with the network. Under these scenarios, the network will no longer receive TCP acknowledgements from the user equipment, and may begin to exponentially increase a backoff timer for transmitting further data to the user equipment for the data connection. After the user equipment has finished the voice call or has finished checking paging indicators, the user equipment may then desire to continue with the data connection. However, in the interim, the network may have substantially increased the backoff timer for further data transmission to the user equipment. Instead of waiting for the backoff timer to expire, the user equipment may instead retransmit a prior TCP acknowledgement that includes a previously acknowledged TCP sequence number to the network in an attempt to restart data transfer without waiting for the backoff timer to expire.

In multi-SIM use cases, as another example, the system logic 114 may give circuit switched (CS) sessions (e.g., a voice call connection) priority over packet switched (PS) sessions (e.g., a data connection). A PS session on a first SIM may be suspended due to impending CS activity on a second SIM. Over the duration of the CS activity on the second SIM, the PS session on the first SIM may go into a sequence of exponential backoff. A peer of the PS session (e.g., a network controller, or communication peer) may not be aware of the local suspension of the first SIM in the user equipment 100, and may interpret a delay in communication as, for example, network congestion or an unreliable link. Such delays may cause the peer to begin an exponentially increasing backoff timer, which leads to large retransmission timeouts and ultimately to poor downlink or uplink throughput performance and poor user experience. Further, resumption of the PS session on the first SIM (after CS termination on the second SIM) does not immediately translate into resumption of data transfer on the PS session, because the peer may be waiting for expiration of the backoff timer before sending more data to the user equipment 100, for example.

Figure 2:
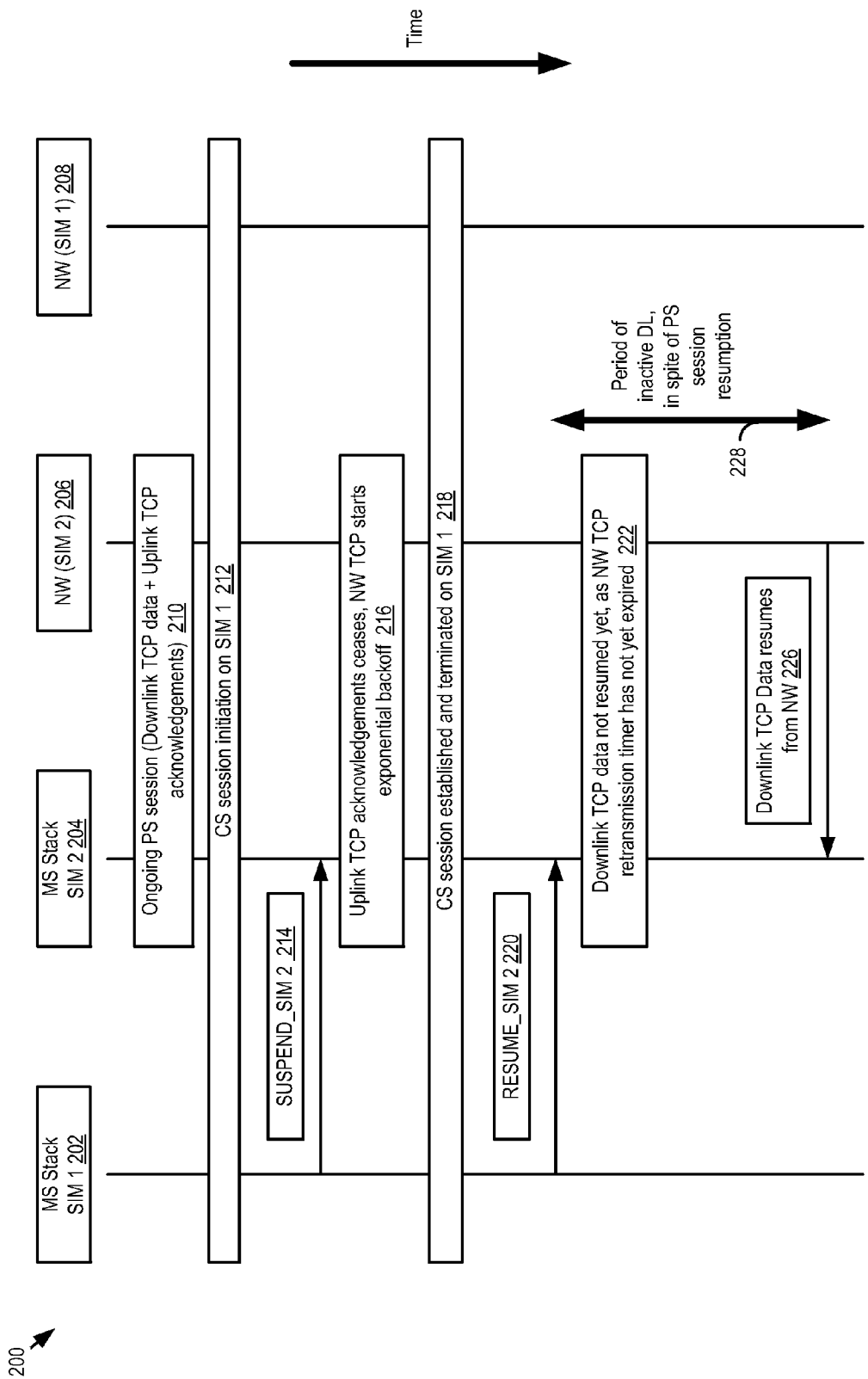
FIGS. 2 and 3 illustrate sequence diagrams that show session scheduling in example multi-SIM use cases.
Figure 3:
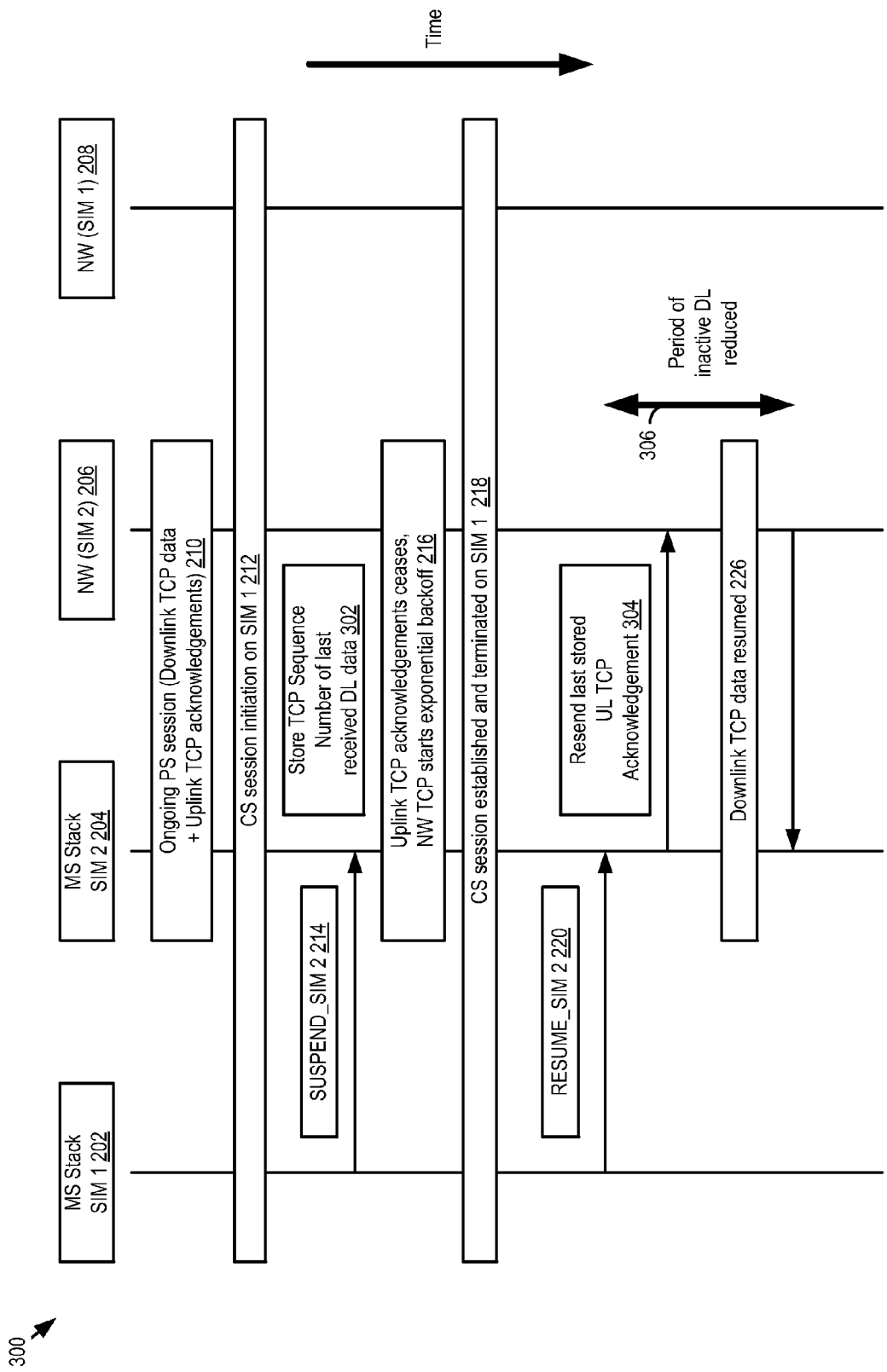

FIG. 2 shows an example sequence diagram 200 that illustrates example operations that may cause the abovementioned inefficiency in multi-SIM use cases. FIG. 3 shows an example sequence diagram 300 that illustrates logic that the user equipment 100 may implement for remedying the abovementioned inefficiency in multi-SIM use cases.

In particular, FIGS. 2 and 3 depict SIM 1 102 and SIM 2 104, each hosted by user equipment (e.g., user equipment 100), and a first network peer 206 and a second network peer 208. The sequence diagrams illustrate a sequence including an ongoing PS session with respect to the first SIM 204 and the first network peer 206 (210), where, for example, a network connection for a first SIM receives TCP data and transmits TCP acknowledgements. Also, a CS session can be initiated with respect to respect to the second SIM 202 and the second network peer 208 (212). The system logic 114 may also suspend the second SIM 202 PS session (214). While the PS session is suspended, uplink TCP acknowledgements from SIM 2 104 cease and the TCP controller of the first network peer 206 may start exponential backoff, for example (216). When the CS session terminates, the system logic 114 may allow the second SIM 202 to resume the PS session (220). Although the PS session is resumed, the user equipment 100 still has not begun receiving data from the first network peer 206, which may be because the TCP retransmission timer (e.g., the exponential backoff timer) of the first network peer has not yet expired (222). Eventually, the backoff timer may expire and after that delay 228 the first network peer 206 starts again to send packets over the PS session (226). However, the duration of delay may be significant, e.g., enough to be perceptible to the user, who may perceive the delay as poor throughput.

To address the delay 228 and provide enhanced throughput, the system logic 114 may implement the logic 300. The memory 120 may store a TCP sequence number of a last transmitted (by the user equipment 100) TCP acknowledgement (302). In most instances, the first network peer 206 will receive the TCP acknowledgment and recognize that the user equipment 100 has successfully received the associated packet. After the system logic 114 resumes the PS session on SIM 2 104, the user equipment 100 may send an acknowledgement to the first network peer 206 including the stored TCP sequence number (304). Once the acknowledgement is received by the first network peer 206, it may immediately begin to transmit data to the user equipment. In other words, at 304 the user equipment 100 retransmits an acknowledgement of the last received TCP packet, including the sequence number of the last received and previously acknowledged packet. When the network peer 206 receives the acknowledgment, it may terminate its retransmission timer and begin to send data again over the PS session, without waiting for the retransmission timer to expire. As a result, the resumption delay 306 may be significantly shorter than the resumption delay 228.

Figure 4:
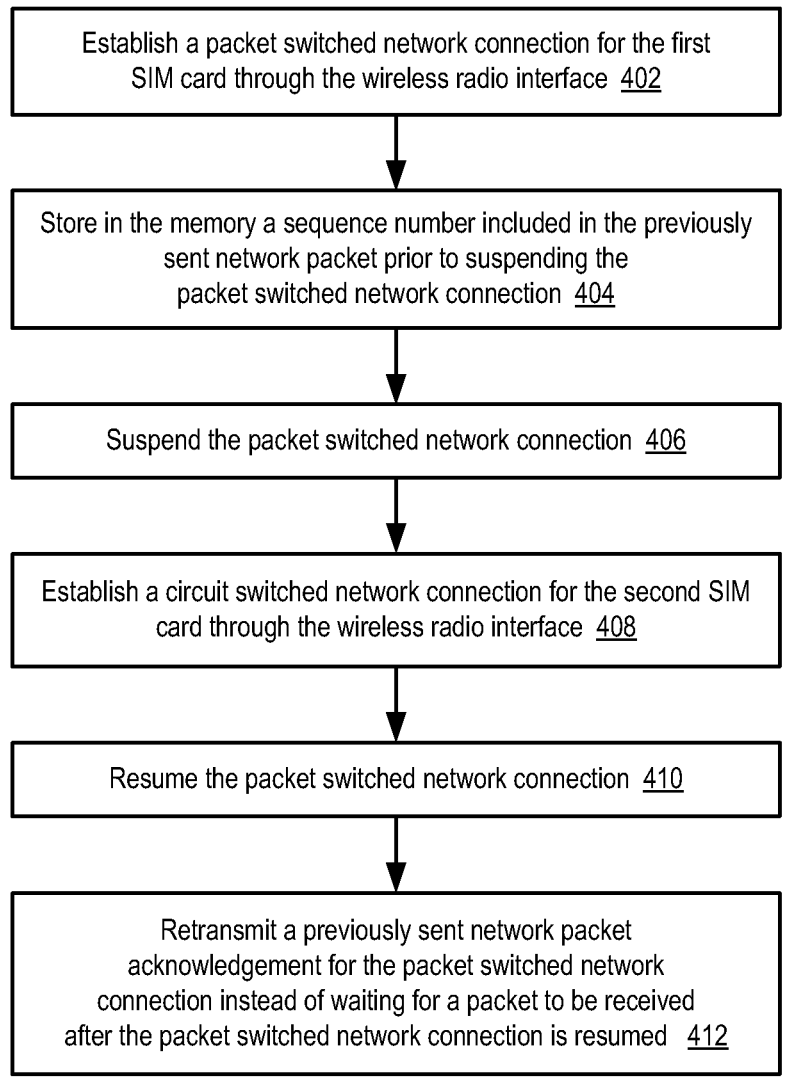
FIG. 4 shows example logic that the user equipment may implement to improve data throughput.

FIG. 4 shows example logic 400 that the system logic 114 may implement, for example with the processor 116 and the acknowledgement instructions 122. The logic 400 may establish a PS network connection for the SIM1 102 through the communication interface 112 (402). The logic 400 may also suspend the PS network connection (406), but may also store in the memory 120 a characteristic of a previously acknowledged packet, such as a sequence number (e.g., a TCP sequence number) included in the previously sent network packet (404). Once the PS network connection is suspended, the logic 400 may establish a CS network connection for the SIM2 104 through the communication interface (408). Once the CS connection is terminated, the logic 400 may resume the PS network connection (410). In resuming the connection, the logic 400 may cause the communication interface 112 to retransmit a previously sent network packet acknowledgement for the PS network connection that includes the previous sequence number (412). As mentioned above, by retransmitting a previously sent acknowledgement that includes the previous sequence number, the resumption delay 306 may be reduced.

Figure 5:
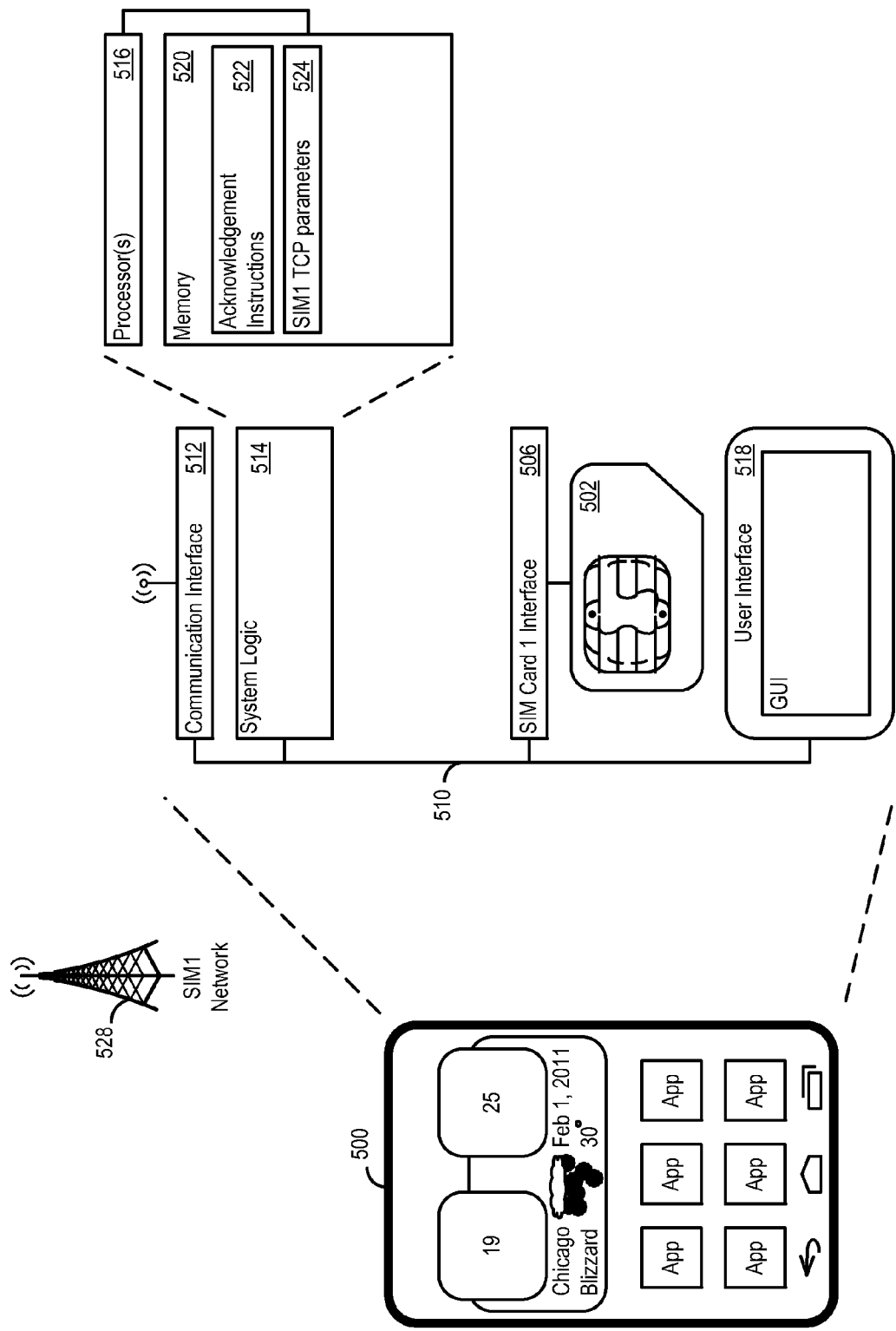
FIG. 5 shows an example of user equipment with a single SIM.

FIG. 5 shows an example of user equipment 500 with a single SIM, in this example the SIM1 502. An electrical and physical interface 506 connects SIM1 502 to the rest of the user equipment hardware, for example, to the system bus 510. The user equipment 500 includes a communication interface 512, system logic 514, and a user interface 518, which may be implemented in the same or different manner as the communication interface 112, the system logic 114, and the user interface 118.

In one implementation, the system logic 514 includes one or more processors 516 and a memory 520. The memory 520 stores, for example, acknowledgement instructions 522 that the processor 516 executes. Node B 528 may manage a particular cell to which the SIM1 502 is connected. Accordingly, TCP or another communication protocol may govern a communication session for the SIM1 502. The user equipment 500 may store a set of TCP parameters for the SIM1 502 in the memory 520 as the SIM1 TCP parameters 524.

Figure 6:
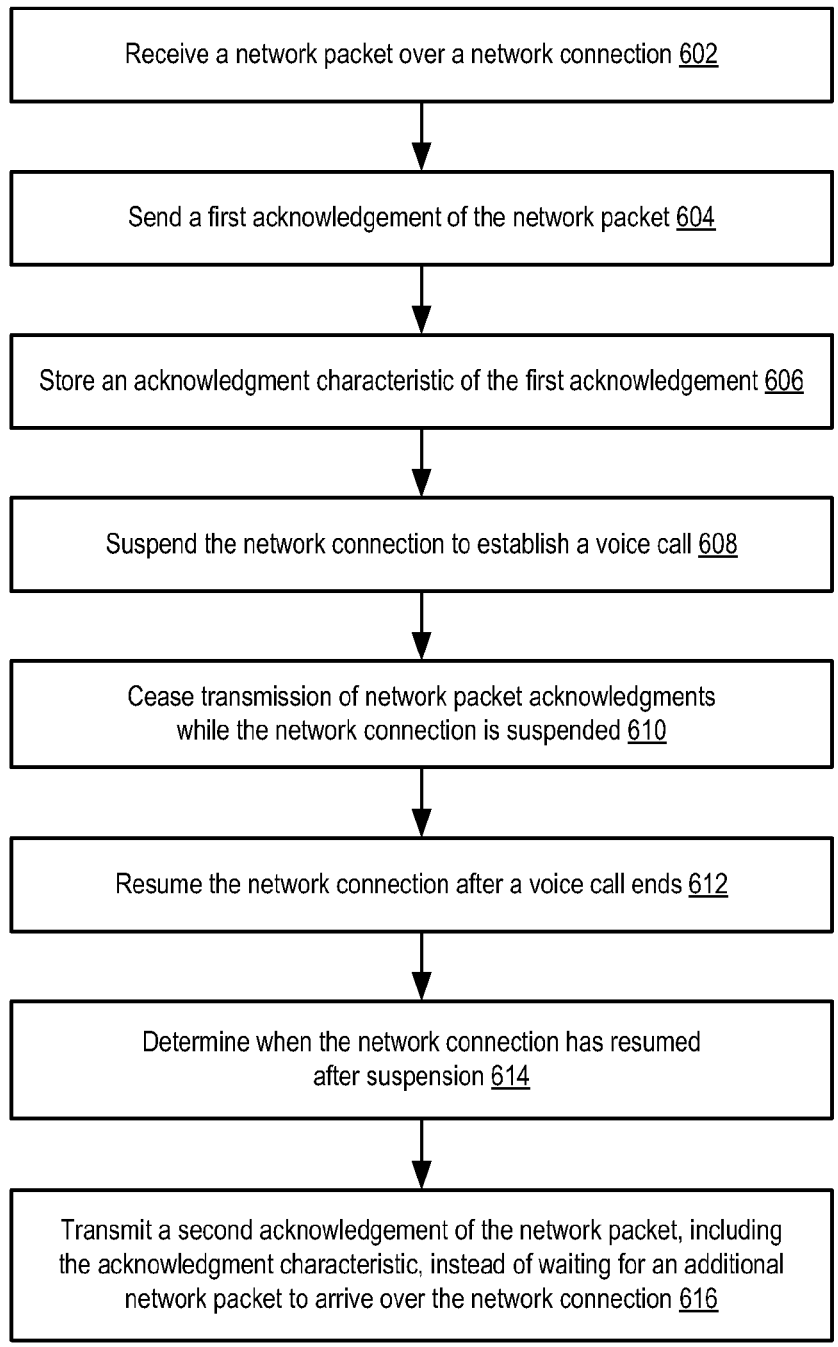
FIG. 6 shows example logic that user equipment may implement to improve throughput.

FIG. 6 shows example logic 600 that may be implemented (e.g., by the system logic 114 or 514) in user equipment having one or more SIMs, such as the user equipment 100 or 500. The logic 600 may receive a network packet over a network connection (602). The logic 600 may also send a first acknowledgement of the network packet (604). After, during, or prior to sending the first acknowledgement, the logic 600 may store an acknowledgment characteristic (e.g., sequence number) of the first acknowledgement (606). After storing the acknowledgement characteristic of the first acknowledgement, the logic 600 may suspend the network connection to establish a voice call (608). While the network connection is suspended, the logic 600 may cease transmission of network packet acknowledgments (610). After the voice call ends, the logic 600 may resume the network connection (612). The logic 600 may also determine when the network connection has resumed after suspension (614), and transmit a second acknowledgement of the network packet that includes the acknowledgment characteristic (616), instead of waiting for an additional network packet to arrive over the network connection. In other words, instead of waiting for a retransmission timer to expire, the logic 600 may cause the network peer to resume transmission of data over the PS session by sending the acknowledgment that includes a previously acknowledged sequence number.

Virtual Modem Resumption Handler

In some implementations of the user equipment, such as user equipment 100, 500, or the like, one or more SIMs may benefit from a virtual modem resumption handler (VMRH).

This application makes reference to a virtual modem. A virtual modem may refer to a software implementation of physical resources of the user equipment 100, for example through hardware virtualization. As described above with respect to the communication interface 112, the user equipment 100 may include one or more sets of physical baseband or RF resources, such as coders/decoders, modulators, amplifiers, and antennas. A virtual modem may represent a software virtualization of any of the resources in the RF path in the communication interface 112. Accordingly, each SIM of the user equipment 100 may be assigned a virtual modem, and thus recognize and use the virtualized communication resources of the virtual modem to communicate across a network, without the need to understand or deal with the complexities that may arise from sharing RF path hardware between multiple SIMs. A separate virtual modem may be instantiated and assigned to each SIM to communicate across the respective network that a respective SIM is connected to. Said another way, multiple virtual modems may share a common set of physical communication resources of the user equipment 100, with the virtual modems managed and controlled by virtual modem logic, such as a virtual machine controller, which may be implemented in hardware, software, or both. The virtual modem logic, as one example, may schedule or otherwise manage access to the RF path hardware for each SIM, as well as respond to requests made by the virtual modems for access to the RF path resources for their particular SIM.

When a first virtual modem is suspended (e.g., suspended in a UMTS power saving mode such as CELL_PCH/URA_PCH) it may not always be possible to inform a network controller of the suspension and to gracefully terminate the connection. One reason is that termination can be time consuming, and the second SIM may not be able to wait for graceful termination before accessing the communication interface 112. For example, in a dual SIM environment, the virtual modem for the second SIM may need immediate access to the communication interface 112 to receive a paging indicator, or to make a call. As a result, the virtual modem for the active SIM may deactivate locally, such as by shutting down, stopping communications by the active SIM with the RF resources, releasing resources used to support the virtual modem, including communication interface 112 resources, memory resources, processor resources, and the like. Local deactivation may occur with or without informing the network controller, or without completing a termination sequence with the network controller to achieve a graceful termination. After local deactivation, the system logic 114 may allow the virtual modem for SIM 2 104 to proceed with making or receiving a call. However, with this technique, when the first virtual modem is resumed, it may monitor for incoming calls using idle mode paging parameters that were in place when the first virtual modem was suspended (e.g., was in idle mode). Using the idle mode paging parameters may lead to missed calls in some user equipment or network configurations. One reason for the missed calls is that the first virtual modem did not gracefully terminate with the network controller, and the network controller may therefore be using connected mode paging parameters for the first virtual modem. In other words, the network controller uses parameters that do not match the state of the first virtual modem.

In one implementation, the user equipment 100 may facilitate synchronization with the network controller by executing a registration procedure. More specifically, when the first virtual modem resumes, it may establish a connection with the network controller by executing the UMTS registration procedure. This may happen even if the cell selected for communication when the virtual modem resumes is the same cell that the virtual modem was connected to when the first virtual modem was suspended.

Figure 7:
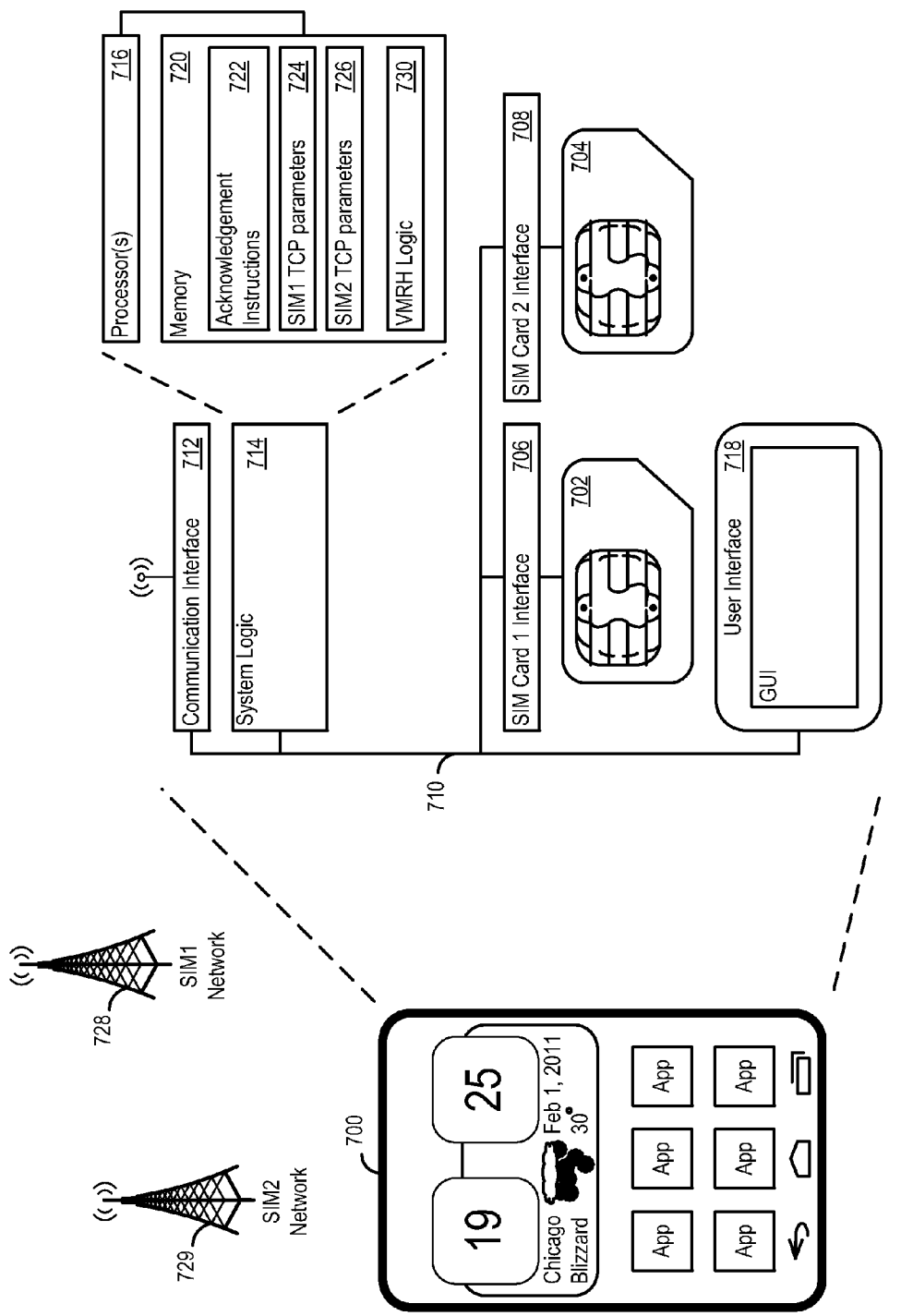
FIG. 7 shows another example of user equipment with multiple SIMs.

FIG. 7 shows an example of user equipment 700 similar to user equipment 100, except system logic 714 of the user equipment 700 further includes VMRH logic 730. Similarly, the user equipment 700 includes multiple SIMs, in this example the SIM1 702 and the SIM2 704. An electrical and physical interface 706 connects SIM1 702 to the rest of the user equipment hardware, for example, to the system bus 710. Similarly, an electrical and physical interface 708 connects the SIM2 to the system bus 710. Further, for example, the user equipment 700 includes a communication interface 712, the system logic 714, and a user interface 718, which may be implemented in the same or different manner as the communication interface 112, the system logic 114, and the user interface 118.

In one implementation, the system logic 714 includes one or more processors 716 and a memory 720. The memory 720 stores, for example, acknowledgement instructions 722 and VMRH logic 730 that the processor 716 can execute, for example. Node B 728 may manage a particular cell to which the SIM1 702 is connected, and Node B 729 may manage a particular cell to which the SIM 2 704 is connected. Accordingly, TCP or another communication protocol may govern a communication session for the SIM1 702 or the SIM2 704. The user equipment 700 may store a set of TCP parameters for the SIM1 702 and the SIM2 704 in the memory 720 as the SIM1 TCP parameters 524 and the SIM TCP parameters 526, respectively. The VMRH logic 730 and other aspects of the system logic 714 may support the VMRH.

A network controller, such as a network controller of Node B 728 or 729, includes a communication interface, processors, and memory. The hardware and software in the network controller may be implemented as a UMTS Node B, GSM base station, or other type of network controller. A network controller may be to include logic that interacts with transmissions sent from the equipment 700. For example, the network controller 700 may include logic that interacts with aspects of the system logic 714.

Figure 8:
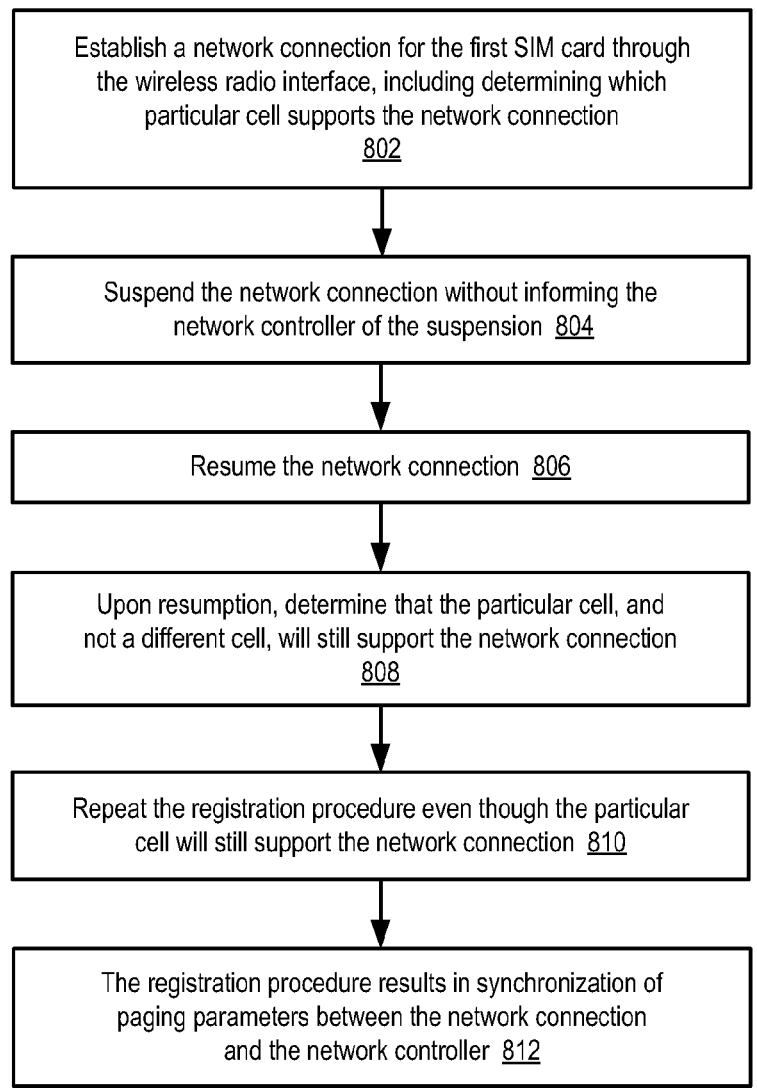
FIGS. 8 and 9 show example logic that user equipment may implement to handle virtual modem resumption.

FIG. 8 shows example logic 800 that may be implemented (e.g., by the system logic 714) in user equipment having one or more SIMs, such as the user equipment 700. The logic 800 may establish a network connection for a first SIM card (e.g., SIM1 702) through a wireless radio interface (e.g., a wireless radio interface of the communication interface 712) (802). In addition, the logic 800 may determine which particular cell supports the network connection, such as by identifying and storing a cell identifier. Any time after establishing the network connection for the first SIM, the logic 800 may suspend the network connection (804). This suspension may occur without informing a network controller of the suspension.

When the network connection is resumed (806), the logic 800 may determine that the particular cell previously supporting the first SIM, and not a different cell, will still support the network connection (808). Further, the logic 800 may repeat the registration procedure, even though the particular cell will still support the network connection (810). The registration procedure may be a UMTS registration procedure. The registration procedure may also be one that the first SIM carries out when the first SIM finds the particular cell that it will communicate with, before, for example, camping on the cell. The reregistration results in synchronization of paging parameters between the network connection and the network controller (812). As a result, the first SIM may more reliably receive calls.

Figure 9:
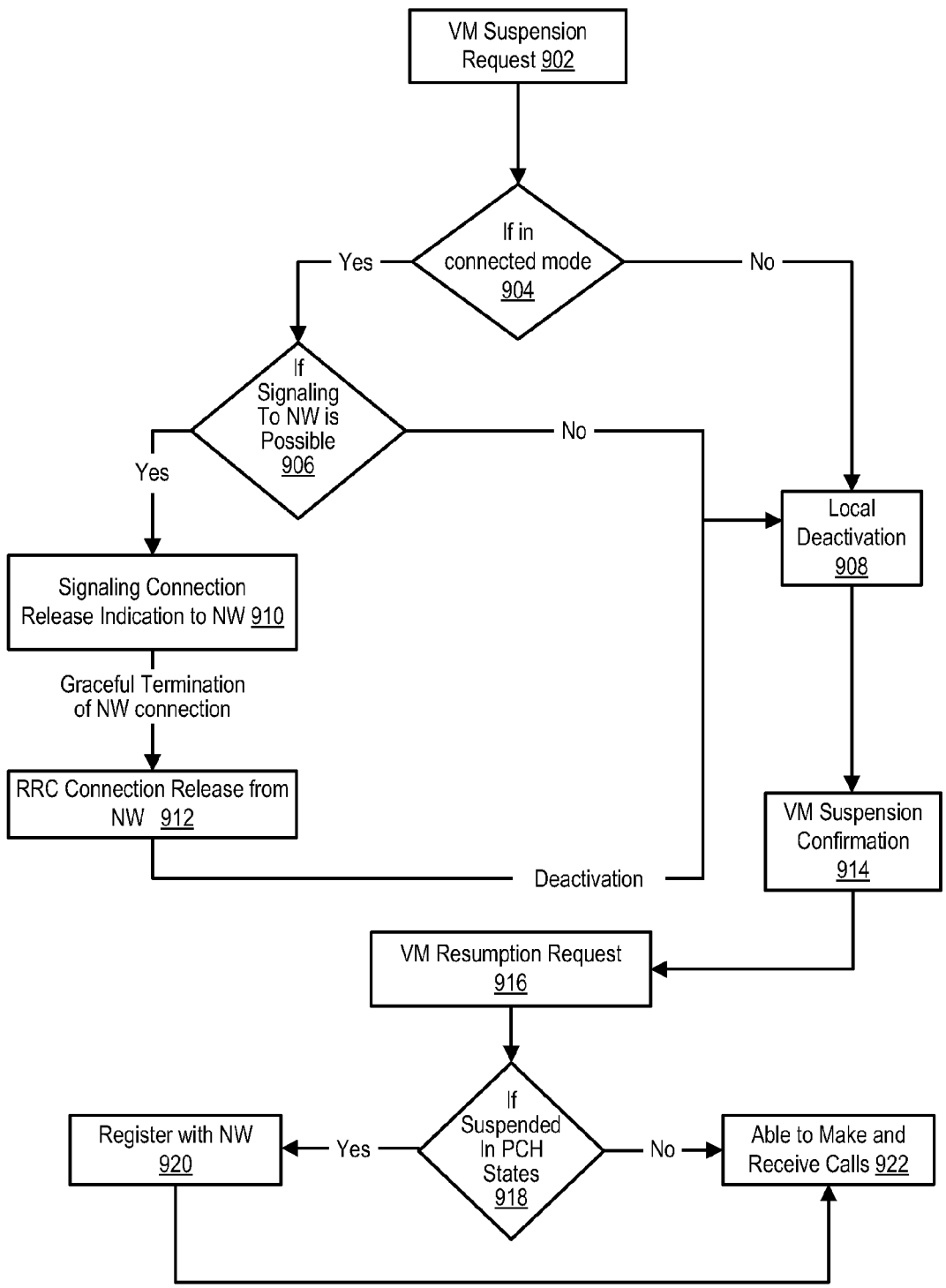

FIG. 9 shows another example of logic 900 that the system logic 114 or 714 may implement, for example, to facilitate synchronization between a virtual modem and a network controller. The logic 900 may suspend a virtual modem (e.g., for SIM 1 702) (902). The logic 900 also may determine whether the user equipment is in connected mode (e.g., for SIM 1 702) (904). If so, the logic 900 may determine whether signaling with the network controller is possible (906). For example, signaling may not be possible if the user equipment 100 enters a UMTS power saving connected mode state such as CELL_PCH/URA_PCH. If signaling is not possible or if the user equipment is not in connected mode, the logic 900 may perform local deactivation, as explained above (908). However, if signaling to the network controller is possible, the logic 900 may perform a graceful termination of the network connection (910). The radio resource control (RRC) in the network confirms the connection release with the user equipment 100 (912), and local deactivation may occur (908).

Local deactivation results in confirmation of suspension of the associated virtual modem (914). At some later time, the logic 900 may receive a virtual modem resumption request (916). For example, a voice call may terminate, allowing a different SIM to regain the communication interface 112 to continue a PS connection that was interrupted for the voice call. When the system logic 114 resumes the suspended virtual mode, the logic 900 may determine whether the virtual modem was suspended in a manner that did not permit graceful termination of its connection with the network (918). As one example, the logic 900 may determine whether the user equipment 100 was suspended in a PCH power saving state noted above. If there was no graceful termination, the logic 900 may reregister with the network controller (920). Doing so may help the user equipment resynchronize with the network controller and therefore more reliably establish data or voice connections. If there was a graceful termination, the logic 900 may forgo reregistration, and in such situations, the user equipment may already be in synchronization with the network controller. Once in synchronization with the network controller, the user equipment may reliably establish data or voice connections (922).

The techniques described in this detailed description are not limited to any particular communication standard, communication standard parameters, or control or communication channels. The methods, devices, techniques, and logic described in this detailed description may be implemented in many different ways in many different combinations of hardware, software or firmware or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A system, comprising:
a wireless radio interface;
a first subscriber identity module (SIM) card interface configured to accept a first SIM card;
a second SIM card interface configured to accept a second SIM card;
a processor in communication with the wireless radio interface and SIM card interfaces; and
a memory device in communication with the processor, the memory device comprising instructions executable by the processor to:
establish a packet switched network connection for the first SIM card through the wireless radio interface;
suspend the packet switched network connection;
establish a circuit switched network connection for the second SIM card through the wireless radio interface;
resume the packet switched network connection; and
retransmit a previously sent network packet acknowledgement for the packet switched network connection without waiting for a packet to be received after the packet switched network connection is resumed.

2. The system of claim 1, wherein the memory device further comprises instructions executable by the processor to store in the memory device a sequence number included in the previously sent network packet acknowledgement prior to suspending the packet switched network connection.

3. The system of claim 1, wherein the packet switched network connection is for a data connection.

4. The system of claim 3, wherein the circuit switched network connection is for a voice call that takes precedence over the data connection.

5. The system of claim 1, wherein the previously sent network packet acknowledgement comprises a sequence number.

6. The system of claim 5, wherein the packet switched network connection comprises a Transmission Control Protocol (TCP) connection.

7. The system of claim 1, wherein the memory device further comprises instructions executable by the processor to perform the retransmission prior to expiration of a timer.

8. The system of claim 7, wherein the timer comprises a network connection retransmission timer.

9. An apparatus, comprising:
wireless radio circuitry;
first subscriber identity module (SIM) card interface circuitry;
second SIM card interface circuitry;
control circuitry in communication with the wireless radio circuitry, the first SIM card interface circuitry, and the second SIM card interface circuitry, the control circuitry configured to:
establish a packet switched network connection associated with the first SIM card interface through the wireless radio circuitry;
suspend the packet switched network connection;
establish a circuit switched network connection associated with the second SIM card interface through the wireless radio circuitry;
resume the packet switched network connection; and
retransmit a previously sent network packet acknowledgement for the packet switched network connection prior to receiving a packet after the packet switched network connection is resumed.

10. The apparatus of claim 9, wherein the control circuitry is further configured to store a sequence number included in the previously sent network packet acknowledgement prior to suspending the packet switched network connection.

11. The apparatus of claim 9, wherein the packet switched network connection is for a data connection.

12. The apparatus of claim 11, wherein the circuit switched network connection is for a voice call that takes precedence over the data connection.

13. The apparatus of claim 9, wherein the previously sent network packet acknowledgement comprises a sequence number.

14. The apparatus of claim 9, wherein the packet switched network connection comprises a Transmission Control Protocol (TCP) connection.

15. The apparatus of claim 9, wherein the control circuitry is further configured to perform the retransmission prior to expiration of a timer.

16. The apparatus of claim 15, wherein the timer comprises a network connection retransmission timer.

17. A system comprising:
a wireless radio interface; and
control circuitry in communication with the wireless radio interface, the control circuitry configured to:
establish a packet switched network connection for a first subscriber identity module (SIM) card through the wireless radio interface;
suspend the packet switched network connection;
establish a circuit switched network connection for a second SIM card through the wireless radio interface;
resume the packet switched network connection; and
retransmit a previously sent network packet acknowledgement for the packet switched network connection prior to receiving a packet after the packet switched network connection is resumed.

18. The system of claim 17, where the control circuitry is further configured to store a sequence number included in the previously sent network packet acknowledgement prior to suspending the packet switched network connection.

19. The system of claim 17, wherein the packet switched network connection is for a data connection.

20. The system of claim 19, wherein the packet circuit switched network connection is for a voice call that takes precedence over the data connection.

* * * * *